US012680013B2

(12) United States Patent
Huang et al.

(10) Patent No.: US 12,680,013 B2
(45) Date of Patent: *\*Jul. 14, 2026*

(54) COMPOSITION AND METHOD FOR IMPROVING THE PRODUCTION OF PETROLEUM HYDROCARBONS

(71) Applicants:CNPC USA Corporation, Houston, TX (US); Beijing Huamei, Inc., Beijing (CN); China National Petroleum Corporation, Beijing (CN)

(72) Inventors: Jiangshui Huang, Sugar Land, TX (US); Nancy Zhou, Sugar Land, TX (US); Lijun Lin, Katy, TX (US); Fuchen Liu, Panjin (CN); Guodong Wu, Beijing (CN); Bo Huang, Beijing (CN)

(73) Assignees: CNPC USA Corporation, Houston, TX (US); Beijing Huamei, Inc., Beijing (CN); China National Petroleum Corporation, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/230,783

(22) Filed: Jun. 6, 2025

(65) Prior Publication Data

US 2025/0297154 A1 Sep. 25, 2025

Related U.S. Application Data

(60) Continuation of application No. 18/392,303, filed on Dec. 21, 2023, now Pat. No. 12,325,824, which is a continuation of application No. 17/987,246, filed on Nov. 15, 2022, now Pat. No. 11,851,612, which is a division of application No. 16/948,368, filed on Sep. 15, 2020, now Pat. No. 11,499,091.

(51) Int. Cl.
| | |
|---|---|
| *C09K 8/68* | (2006.01) |
| *C09K 8/584* | (2006.01) |
| *C09K 8/60* | (2006.01) |
| *C09K 8/66* | (2006.01) |
| *E21B 37/06* | (2006.01) |
| *E21B 41/02* | (2006.01) |
| *E21B 43/26* | (2006.01) |

(52) U.S. Cl.
CPC ............... *C09K 8/68* (2013.01); *C09K 8/584* (2013.01); *C09K 8/602* (2013.01); *C09K 8/665* (2013.01); *E21B 43/26* (2013.01); *E21B 37/06* (2013.01); *E21B 41/02* (2013.01)

(58) Field of Classification Search
CPC . C09K 8/68; C09K 8/602; C09K 8/80; C09K 8/035; C09K 8/805; C09K 8/584; C09K 8/88; C09K 8/74; C09K 8/665; C09K 8/86; C09K 8/72; E21B 43/267; E21B 43/16; E21B 43/26; E21B 37/06; E21B 41/02; E21B 43/25
See application file for complete search history.

(56) References Cited

U.S. PATENT DOCUMENTS

| | | | | |
|---|---|---|---|---|
| 11,499,091 B2 * | 11/2022 | Huang | .................... | C09K 8/602 |
| 2016/0083639 A1 * | 3/2016 | Xu | .......................... | C09K 8/605 |
| | | | | 166/305.1 |
| 2017/0051195 A1 * | 2/2017 | Vanzin | ..................... | C11D 1/83 |
| 2020/0056088 A1 * | 2/2020 | Veldman | .................. | C09K 8/03 |

* cited by examiner

*Primary Examiner* — Zakiya W Bates
(74) *Attorney, Agent, or Firm* — Hogan Lovells US LLP

(57) ABSTRACT

A novel surfactant composition that comprises of two surfactant components, a solvent, and water. The surfactant composition is added to a fracturing fluid, which is then pumped downhole into a subterranean formation where the novel characteristics of the fracturing fluid lend to improved oil production over the fracturing fluid without the surfactant composition.

18 Claims, 8 Drawing Sheets

COMPOSITION AND METHOD FOR IMPROVING THE PRODUCTION OF PETROLEUM HYDROCARBONS

CROSS REFERENCE TO RELATED APPLICATIONS

This application is a continuation application and claims priority to U.S. patent application Ser. No. 18/392,303, titled "Composition and Method for Improving the Production of Petroleum Hydrocarbons," filed Dec. 21, 2023, which is a continuation application and claims priority to U.S. patent application Ser. No. 17/987,246, titled "Composition and Method for Improving the Production of Petroleum Hydrocarbons," filed Nov. 15, 2022, now U.S. Pat. No. 11,851,612, issued Dec. 26, 2023, which is a divisional application and claims priority to U.S. patent application Ser. No. 16/948,368, titled "Composition and Method for Improving the Production of Petroleum Hydrocarbons," filed Sep. 15, 2020, now U.S. Pat. No. 11,499,091, issued Nov. 15, 2022, which are all hereby incorporated herein in their entirety and for all purposes.

BACKGROUND

The disclosure relates generally to the oil and gas industry. The disclosure relates specifically to a fracturing fluid additive.

FIELD OF THE INVENTION

A fracturing fluid can be a water-based composition of several chemical additives with proppant, that is pumped into a subterranean formation and partially returns to the surface. It would be advantageous to employ a surfactant additive that is thermal and hydrolytically stable at high temperature, is tolerant of water of high salinity and hardness, and could change the wettability of subterranean formations from oil-wet to water-wet in order to increase the oil recovery of the formation.

In an embodiment, the surfactant solution is a mixture of a first surfactant, a second surfactant, a solvent, and water. In an embodiment, the first surfactant is an ether sulfonate (anionic surfactant) having the formula $R_1O(R_2O)_x$ $(R_3O)_yCH_2CH(OH)CH_2SO_3M$, where $R_1$ is a linear or branched alkyl group having 5 to 30 carbon atoms, $R_2$ is —$CH_2CH_2$—, $R_3$ is —$CH(CH_3)CH_2$—, x is an integer from 2 to 30, y is an integer from 0 to 20, and M is a monovalent cation including, but not limited to, sodium, lithium, potassium or ammonium. In an embodiment, the concentration of the first surfactant in the surfactant solution is from about 1 wt. % to 65 wt. %. In an embodiment, the concentration of the first surfactant in the surfactant solution is from about 5 wt. % to 55 wt. %. In an embodiment, the concentration of the first surfactant in the surfactant solution is from about 10 wt. % to 45 wt. %.

In an embodiment, the second surfactant is an alkyl alkoxylated nonionic surfactant having the formula $R_4O$ $(R_2O)_m(R_3O)_nH$, where $R_4$ is a linear or branched alkyl group having 5 to 30 carbon atoms, m is an integer from 5 to 30, and n is an integer from 1 to 20. In an embodiment, the concentration of the second surfactant in the surfactant solution is from about 1 wt. % to 80 wt. %. In an embodiment, the concentration of the second surfactant in the surfactant solution is from about 15 wt. % to 65 wt. %. In an embodiment, the concentration of the second surfactant in the surfactant solution is from about 30 wt. % to 50 wt. %.

In an embodiment, the solvent is at least one or any combination of the solvents including, but not limited to, methanol, ethanol, isopropanol, 1-propanol, butanol, acetone, ethyl lactate, glycerol, ethylene glycol, ethylene glycol butyl ether, butyl acetate, and acetic acid. In an embodiment, the solvent is one or any combination of solvents known to one of ordinary skill in the art for use in a wellbore. In an embodiment, the concentration of the solvent in the surfactant solution is from about 1 wt. % to 90 wt. %. In an embodiment, the concentration of the solvent in the surfactant solution is from about 5 wt. % to 50 wt. %. In an embodiment, the concentration of the solvent in the surfactant solution is from about 10 wt. % to 35 wt. %.

In an embodiment, the concentration of water in the surfactant solution is from about 1 wt. % to 90 wt. %. In an embodiment, the concentration of water in the surfactant solution is from about 15 wt. % to 60 wt. %. In an embodiment, the concentration of water in the surfactant solution is from about 30 wt. % to 45 wt. %.

In an embodiment, a method for using the surfactant solution includes mixing the surfactant solution into the fracturing fluids to form a fracturing fluid composition and pumping the fracturing fluid composition into a well bore at a flow rate and a pressure sufficient to fracture the subterranean formation. In an embodiment, the concentration of the surfactant solution in the fracturing fluid is from about 0.02 to 50 gpt (gallon per thousand gallons). In an embodiment, the concentration of the surfactant solution in the fracturing fluid is from about 0.1 gpt to 10 gpt. In an embodiment, the concentration of the surfactant solution in the fracturing fluids is from about 0.5 gpt to 2 gpt. In an embodiment, the fracturing fluid can be a linear gel, a crosslinked gel, or a slickwater. In an embodiment, a gelling agent can be present in the fracturing fluids. In an embodiment, the gelling agent can be hydroxyethyl guar, carboxymethyl guar, hydroxypropyl guar, carboxymethylhydroxypropyl guar, carboxymethylhydroxyethyl guar, carboxyethylcellulose, hydroxyethyl cellulose, carboxymethylhydroxyethylcellulose, carboxymethylcellulose, xanthan, diutan, or any combination thereof. In an embodiment, the fracturing fluids can contain other components including, but not limited to, proppants, biocides, scale inhibitors, clay stabilizers, friction reducers, crosslinking agents, breakers, thermal stabilizers, a pH adjustor, a corrosion inhibitor, an iron control agent, or any combination thereof.

In an embodiment, the surfactant solution can be present in fracturing fluids used as a wettability altering agent to improve or increase the production of petroleum hydrocarbons from high temperature subterranean formations with connate water of high salinity and hardness. The surfactant solution disclosed herein is a novel composition and has several advantages over previous surfactant solutions. The surfactant solution is thermally and hydrolytically stable at a high temperature, is tolerant to connate water of high salinity and hardness, can change the wettability of subterranean formation from oil-wet to water-wet, and improves oil recovery.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

Figure 1:
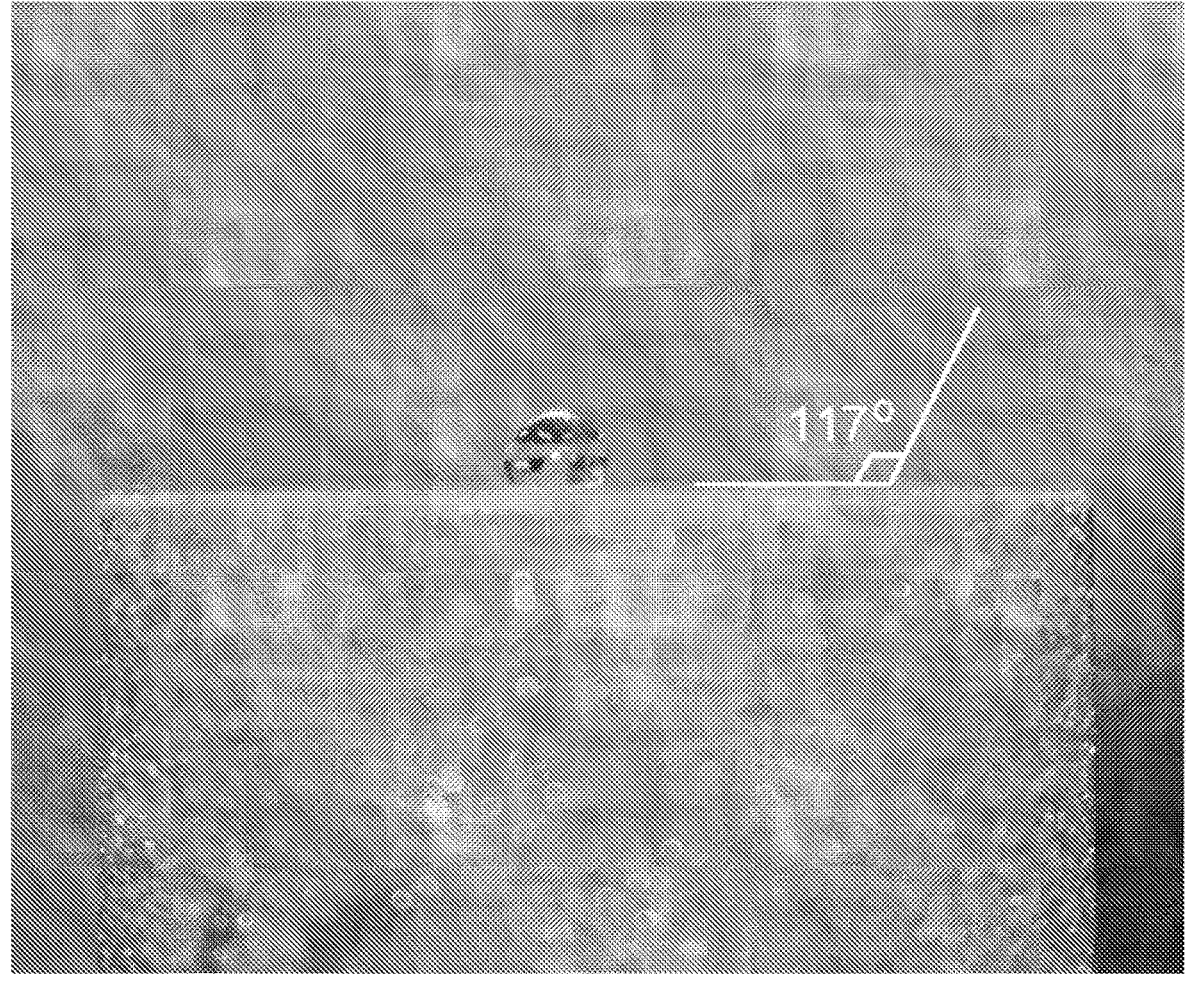
FIG. 1 depicts a photo of the contact angle of a single 5 μL drop of Brine #1 without surfactant that was placed on a Parker sandstone core that had been saturated with crude oil and aged at 176° F. for three weeks.
Figure 2:
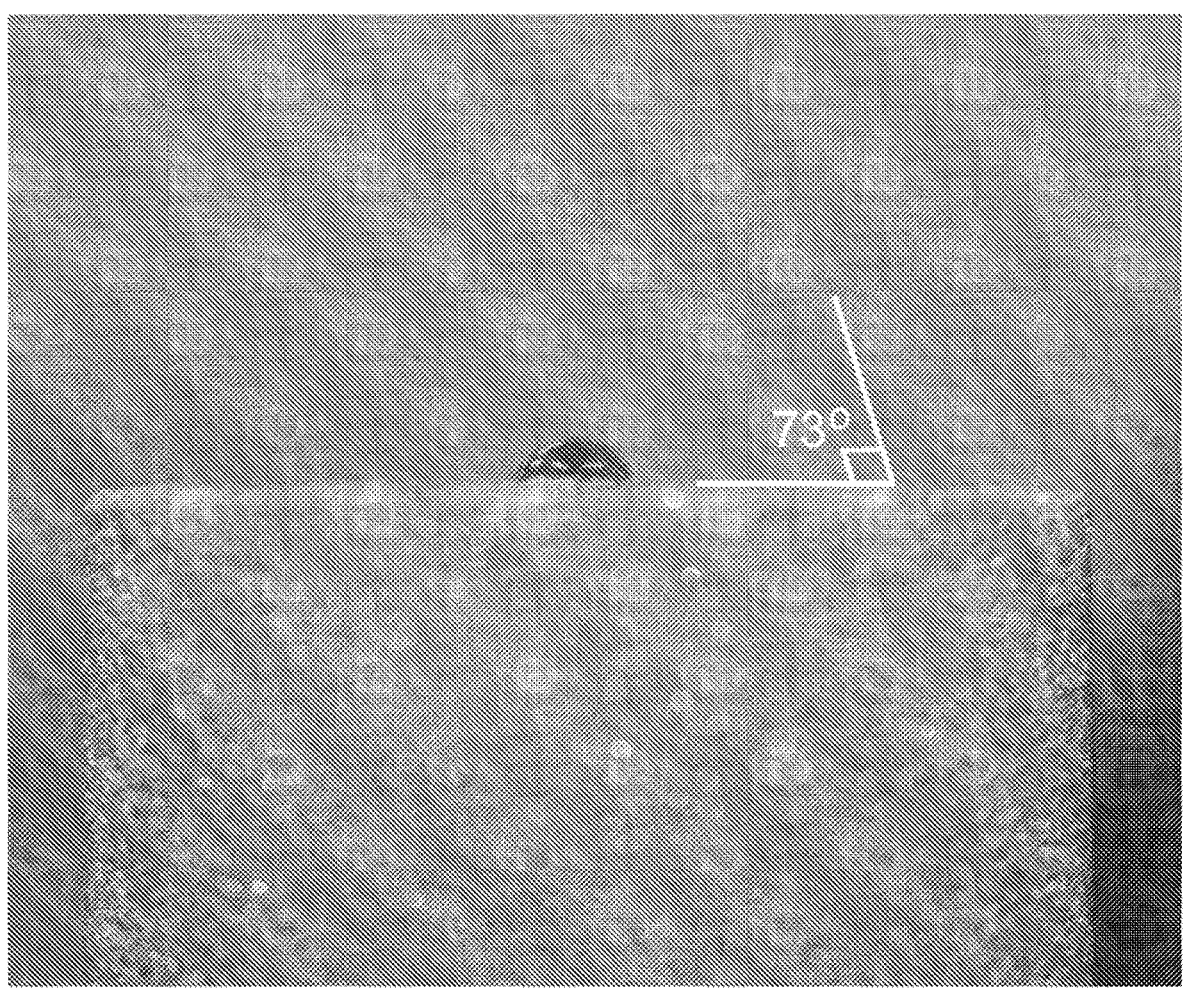
FIG. 2 depicts a photo of the contact angle of a single 5 μL drop of Brine #1 with 1 gpt surfactant solution #1 that was placed on a Parker sandstone core that had been saturated with crude oil and aged at 176° F. for three weeks.
Figure 3:
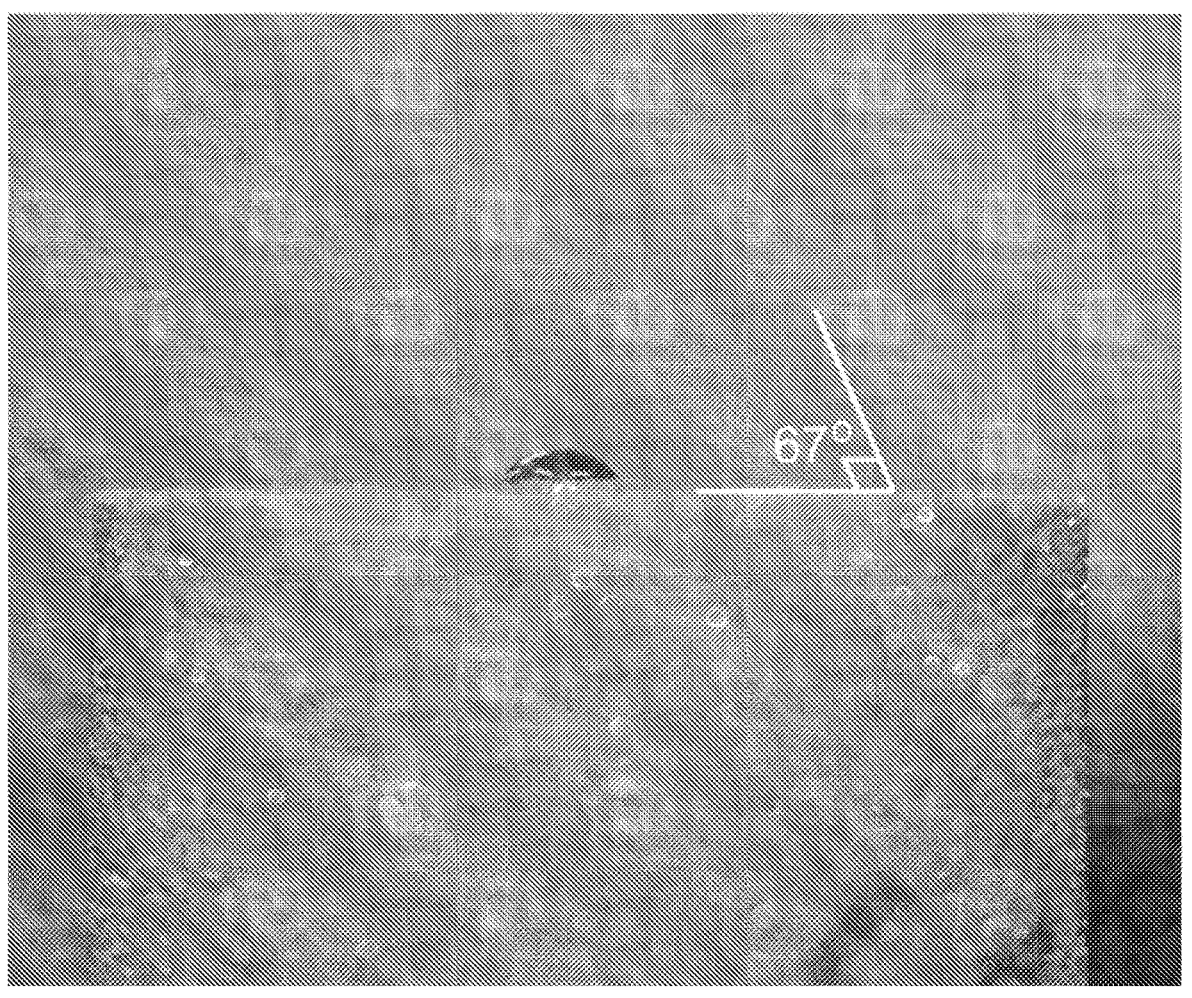
FIG. 3 depicts a photo of the contact angle of a single 5 μL drop of Brine #1 with 1 gpt surfactant solution #2 that was placed on a Parker sandstone core that had been saturated with crude oil and aged at 176° F. for three weeks.
Figure 4:
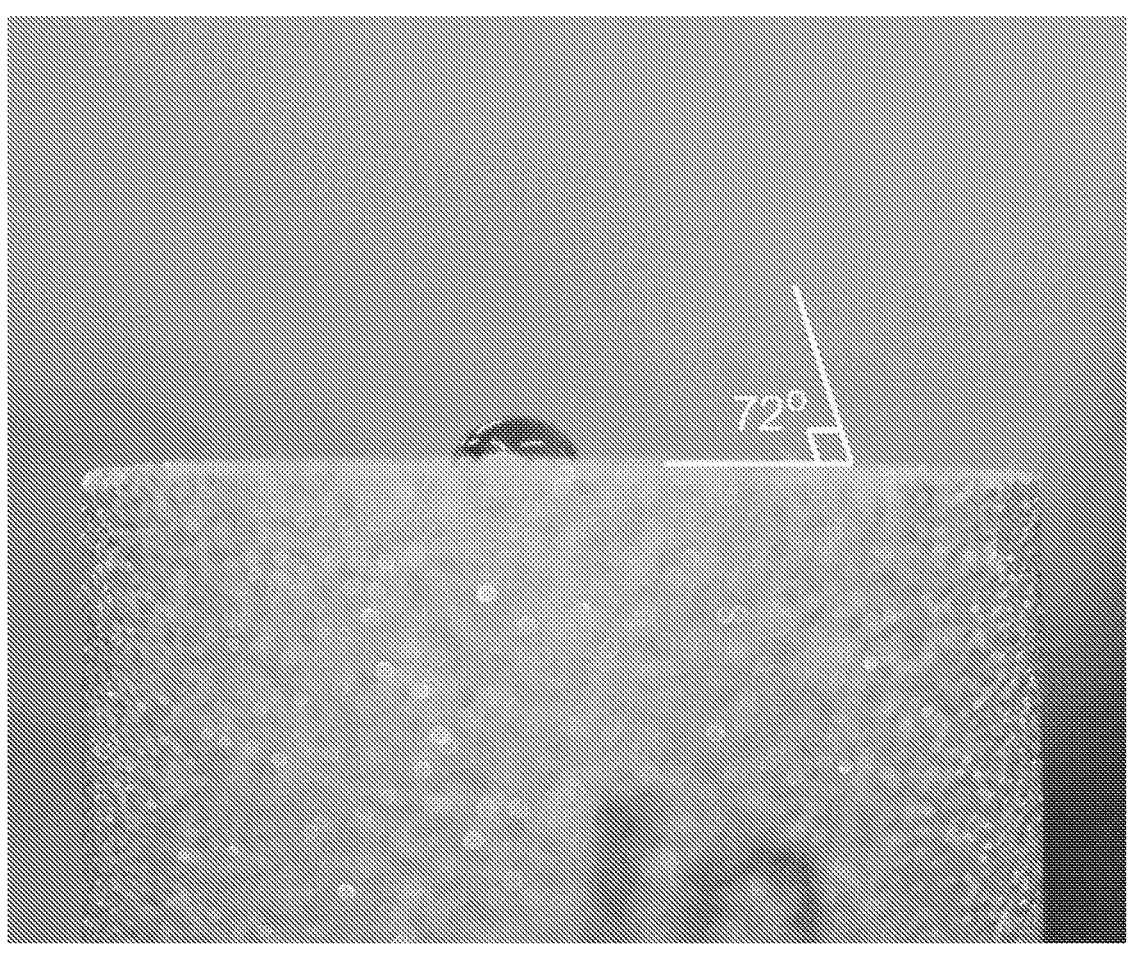
FIG. 4 depicts a photo of the contact angle of a single 5 μL drop of Brine #1 with 1 gpt surfactant solution #3 that was placed on a Parker sandstone core that had been saturated with crude oil and aged at 176° F. for three weeks.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary $3^{rd}$ Edition.

Anionic Surfactants, Nonionic Surfactants, and Solvents
Anionic Surfactants #1-3:

The ether sulfonate (anionic surfactants) tested herein have the following formula:

$$R_1O(R_2O)_x(R_3O)CH_2CH(OH)CH_2SO_3M$$

Where $R_1$ is $C_{11}$ to $C_{14}$ iso-alkyl, $R_2$ is ethyl, and $R_3$ is propyl with structure of $CH(CH_3)CH_2$.
Anionic surfactant #1: x=9 and y=4;
Anionic surfactant #2: x=9 and y=12;
Anionic surfactant #3: x=18 and y=0.
Nonionic Surfactants #1-3:
The alkyl alkoxylated nonionic surfactants tested herein have the following formula:

$$R_4O(R_2O)_m(R_3O)_nH$$

Where $R_4$ is $C_{11}$ to $C_{14}$ iso-alkyl, $R_2$ is ethyl, $R_3$ is propyl with structure of $CH(CH_3)CH_2$.
Nonionic #1: m=18 and n=1;
Nonionic #2: m=9 and n=4;
Nonionic #3: m=9 and n=12.
Solvents
In an embodiment, the solvent is at least one or any combination of the solvents including, but not limited to, methanol, ethanol, isopropanol, 1-propanol, butanol, acetone, ethyl lactate, glycerol, ethylene glycol, ethylene glycol butyl ether, butyl acetate, and acetic acid. In an embodiment, the solvent is one or any combination of solvents known to one of ordinary skill in the art for use in a wellbore.

In an embodiment, ethylene glycol butyl ether can be used as a solvent in the surfactant solution. Ethylene glycol butyl ether (Solvent #1) tested herein has the following structure:

$$CH_3CH_2CH_2CH_2OCH_2CH_2OH$$

Surfactant Solutions
In an embodiment, various surfactant solutions were made by combining an anionic surfactant, a nonionic surfactant, a solvent, and water.

TABLE 1

| Surfactant Solutions #1-3 | | |
| --- | --- | --- |
| Surfactant solution #1 | Surfactant solution #2 | Surfactant solution #3 |
| Anionic #1: 13.0 wt. % | Anionic #2: 13.0 wt. % | Anionic #3: 14.8 wt. % |
| Nonionic #1: 43.0 wt. % | Nonionic #2: 35.2 wt. % | Nonionic #3: 34.2 wt. % |
| Solvent #1: 11.4 wt. % | Solvent #1: 9.3 wt. % | Solvent #1: 9.2 wt. % |
| Water: 32.6 wt. % | Water: 42.5 wt. % | Water: 41.8 wt. % |

Brines
In an embodiment, various brines were made by mixing sodium chloride and calcium chloride in deionized water. In an embodiment, a brine can contain one or more of sodium chloride, calcium chloride, potassium chloride, magnesium chloride, sodium sulfate, and potassium sulfate.

TABLE 2

| Brines #1-5 | | | | | |
| --- | --- | --- | --- | --- | --- |
| | Brine #1 | Brine #2 | Brine #3 | Brine #4 | Brine #5 |
| NaCl (wt %) | 3.0 | 10.0 | 15.0 | 20.0 | 10.0 |
| CaCl₂ (wt %) | 0.5 | 0.5 | 0.5 | 0.5 | 2.0 |

Example 1. Wettability Tests

As illustrated in FIG. 1, FIG. 2, FIG. 3, and FIG. 4, a single drop of brine #1 of 5 μL with and without adding surfactant solutions was placed on Parker sandstone cores which had been saturated with crude oil with an API gravity of 41.7 degrees and aged at 176° F. for 3 weeks. For FIG. 1, FIG. 2, FIG. 3, and FIG. 4, the drops of brine #1 were without adding any surfactant solution, with 1 gpt surfactant solution #1, with 1 gpt surfactant solution #2, and with 1 gpt surfactant solution #3, respectively. As illustrated in FIG. 1, FIG. 2, FIG. 3, and FIG. 4, the contact angles measured were 117°, 73°, 67°, and 72°, respectively, which indicates that the surfactant solutions changed the wettability of the core surfaces from oil-wet (contact angle >90°) to water-wet (contact angle <90°).

Example 2. Thermal Stability Tests

Figure 5:
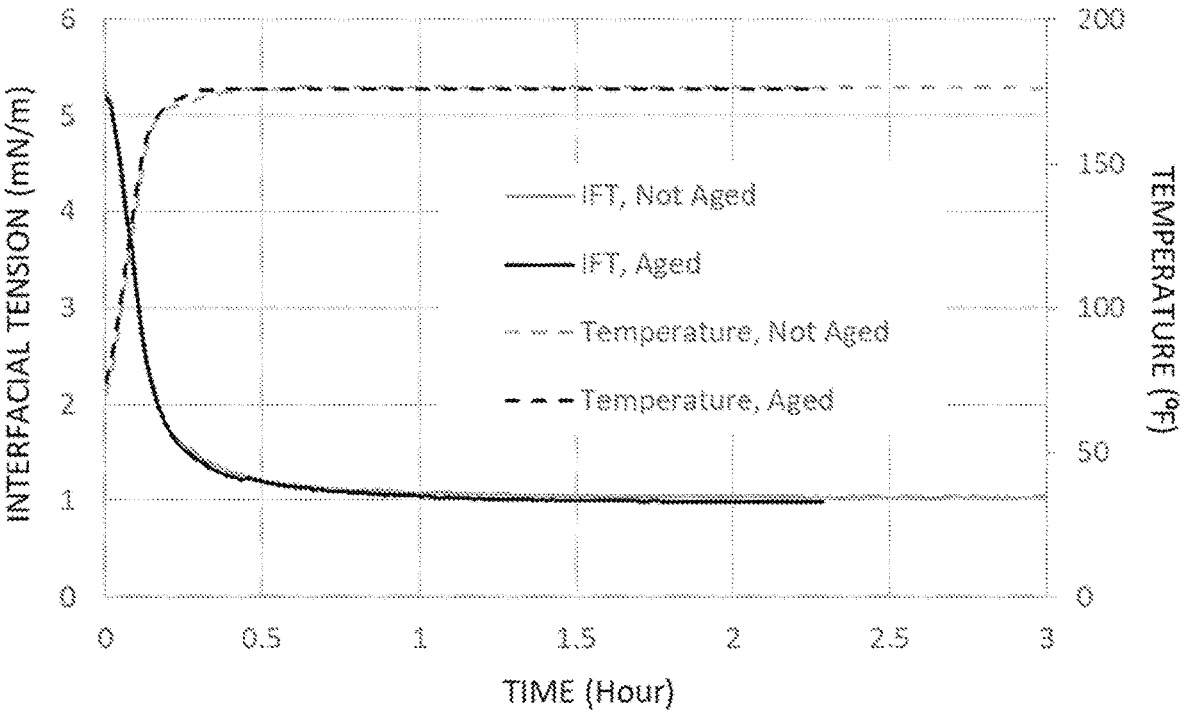
FIG. 5 depicts a graph of interfacial tensions (IFT) that were measured between crude oil and Brine #1 with 1 gpt surfactant solution #1 (aged and unaged at 320° F. for four days). The temperature was increased from room temperature to 176° F., and then was maintained at 176° F. for over 1.5 hours during the IFT measurement.

Thermal stability of the surfactant solutions was tested by comparing the interfacial tensions of the surfactant solutions both aged and unaged at 320° F. for 4 days with a "KRUSS spinning drop tensiometer SDT". The interfacial tensions were measured between Brine #1 with 1 gpt surfactant solution #1 and crude oil with an API gravity of 41.7 degrees as the temperature increased from room temperature to 176° F. and maintained at 176° F. FIG. 5 shows the curves of the interfacial tension vs. time for the surfactant both aged and unaged are almost overlapped which indicates the surfactant is quite thermally stable at 320° F.

Example 3. Salinity and Hardness Compatibility Tests

Figure 6:
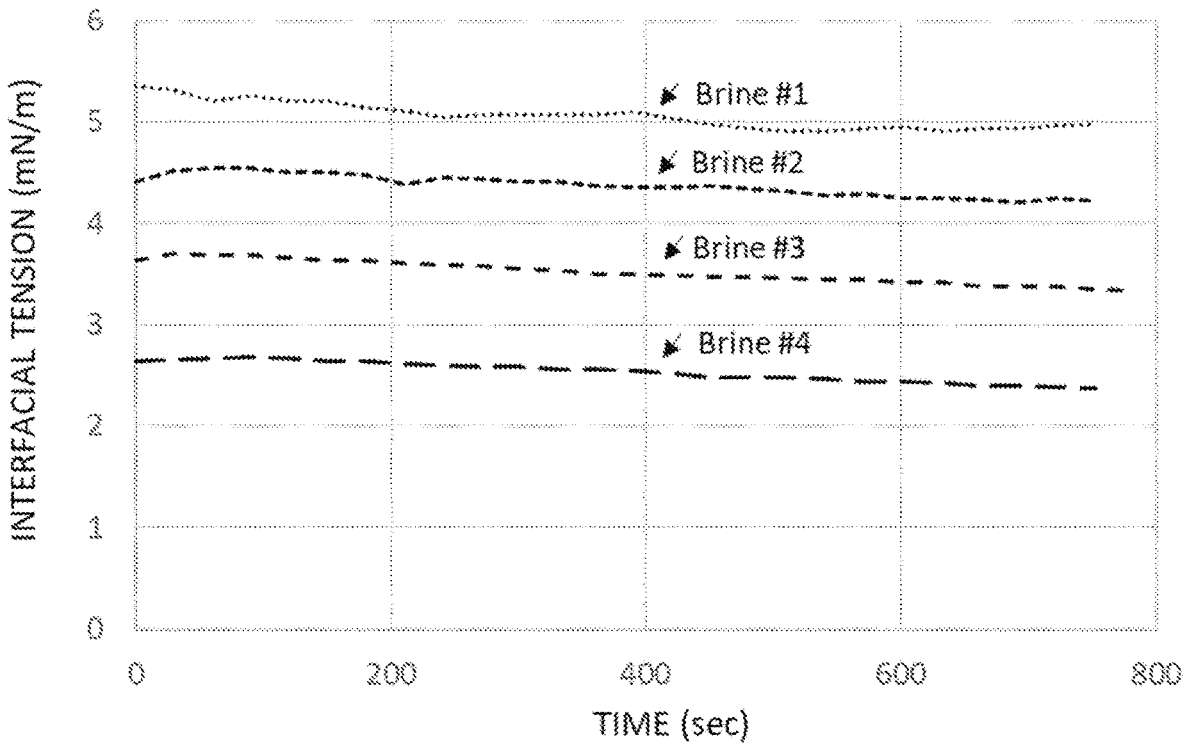
FIG. 6 depicts a graph of interfacial tensions that were measured between crude oil and Brine #1, crude oil and Brine #2, crude oil and Brine #3, crude oil and Brine #4, each with 1 gpt Surfactant Solution #1.
Figure 7:
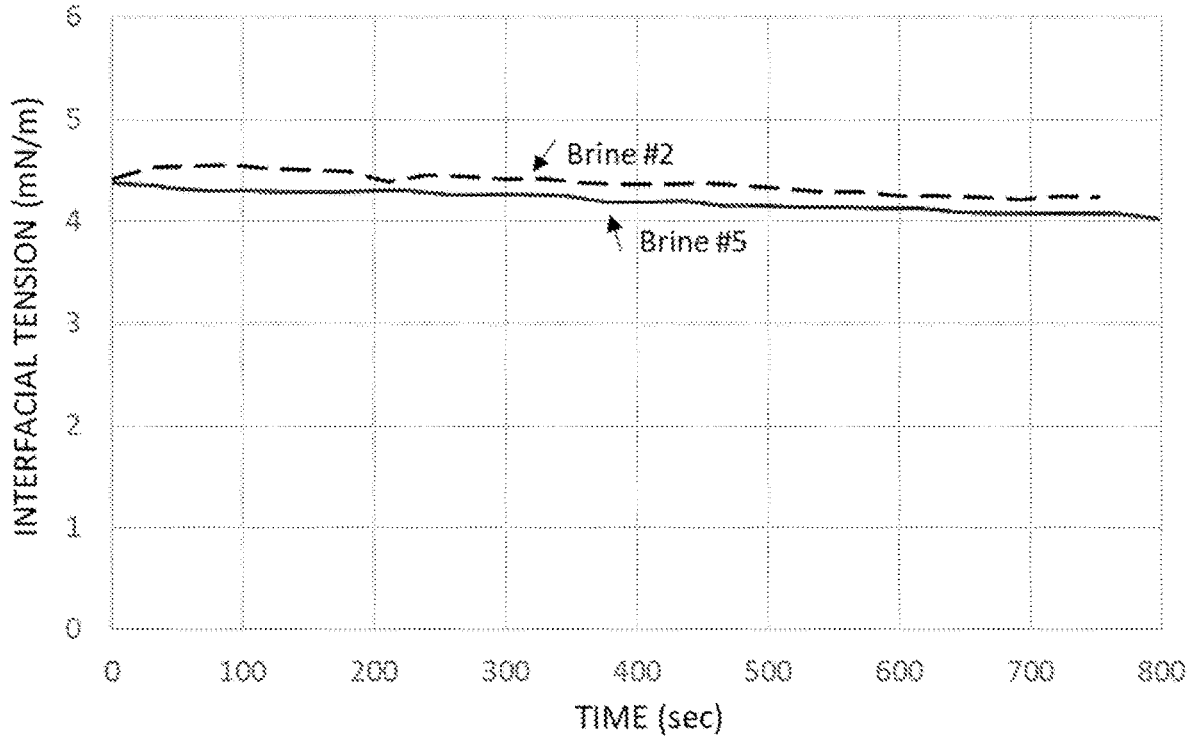
FIG. 7 depicts a graph of interfacial tensions that were measured between crude oil and Brine #2 and crude oil and Brine #5, each with 1 gpt Surfactant Solution #1.

The salinity and hardness compatibility of the surfactant solutions was tested by measuring the interfacial tensions between crude oil and brine with 1 gpt surfactant solutions and different salinity and hardness. The API gravity of the crude oil is 41.7 degrees. FIG. 6 and FIG. 7 show the interfacial tension of the crude oil with Brine #1, Brine #2, Brine #3, Brine #4, or Brine #5 with 1 gpt surfactant solution #1. Various Brines have different salinity and hardness. FIG. 6 shows, as the concentration of sodium chloride increases, the interfacial tension decreases which indicates the surfactant solution is compatible with high salinity. FIG. 7 shows, as the concentration of calcium chloride increases from 0.5 wt. % (Brine #2) to 2.0 wt. % (Brine #5), the interfacial tension slightly decreases which indicates the surfactant solution is compatible with high hardness.

Example 4. Oil Recovery Tests

Figure 8:
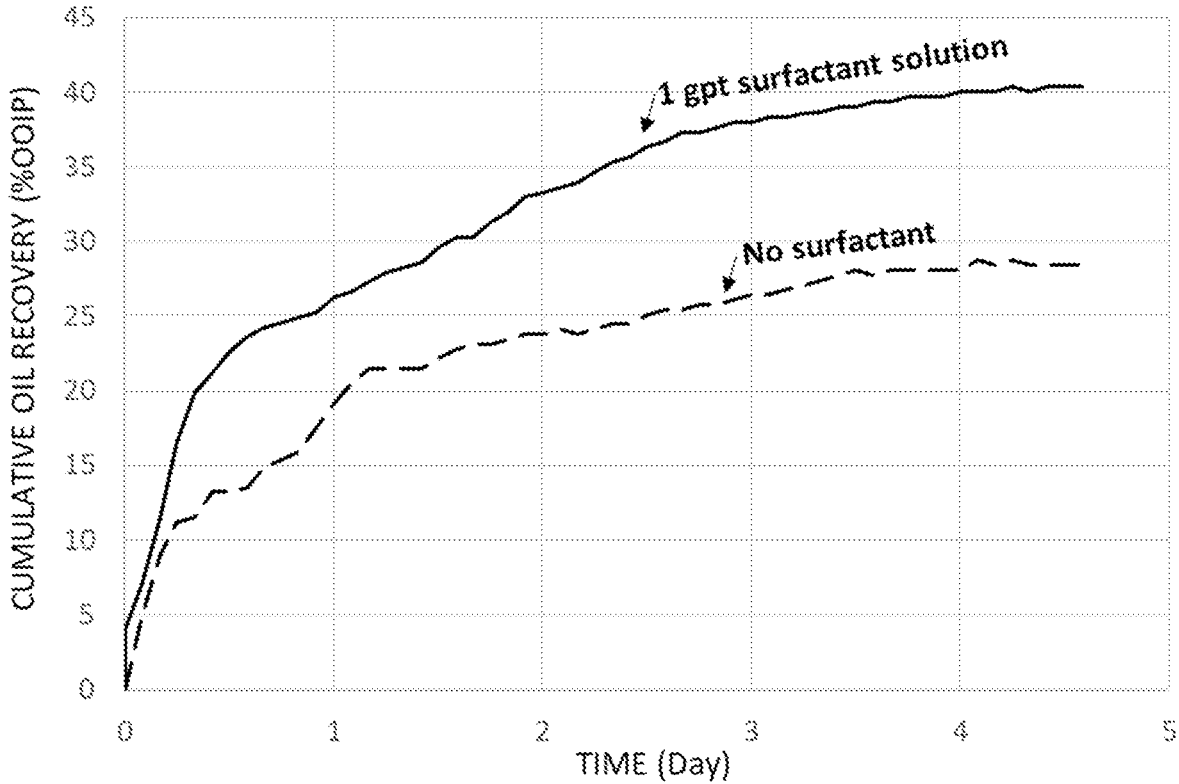
FIG. 8 depicts a graph of cumulative oil recovery rates of the spontaneous imbibition tests at 176° F. for Brine #1 with and without 1 gpt surfactant solution #1.

Spontaneous imbibition tests were used to evaluate the performance of the surfactant solutions on improving and increasing oil recovery. Parker sandstone cores with porosity and permeability about 14% and 6 md respectively were used for the spontaneous imbibition tests. The cores were dried for 24 hours at 176° F., saturated with crude oil with an API gravity of 41.7 degrees, aged at 176° F. for 3 weeks, and then used for the spontaneous imbibition tests. FIG. 8 shows the cumulative oil recovery rates of the spontaneous imbibition tests at 176° F. for Brine #1 with and without 1 gpt surfactant solution #1. The final oil recovery rates are 40.4% OOIP and 28.4% OOIP for the brine with and without surfactant solution, respectively. OOIP stands for original oil-in-place.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

What is claimed is:

1. A surfactant solution for use as an additive in a fracturing fluid, comprising:
   a first surfactant comprising an anionic surfactant;
   a second surfactant comprising a nonionic surfactant;
   a solvent; and
   water;
   wherein a weight percentage ratio between the first surfactant to the second surfactant is about 0.30 to about 0.44, and wherein the second surfactant is an alkyl alkoxylated nonionic surfactant having the formula $R_4O(R_2O)_m(R_3O)_nH$ where $R_4$ is a linear or branched alkyl group having 5 to 30 carbon atoms, m is an integer from 5 to 30, and n is an integer from 1 to 20.

2. The surfactant solution of claim 1, wherein the surfactant solution is mixed with the fracturing fluid to a concentration of about 0.02 to about 50 gallons per thousand gallons of the fracturing fluid.

3. The surfactant solution of claim 1, wherein the fracturing fluid further comprises a gelling agent, a proppant, a biocide, a scale inhibitor, a clay stabilizer, a friction reducer, a crosslinking agent, a breaker, a thermal stabilizer, a pH adjuster, a corrosion inhibitor, an iron control agent, or any combination thereof.

4. The surfactant solution of claim 1, wherein the fracturing fluid further comprises a gelling agent, and wherein the gelling agent comprises hydroxyethyl guar, carboxymethyl guar, hydroxypropyl guar, carboxymethylhydroxypropyl guar, carboxymethylhydroxyethyl guar, carboxyethylcellulose, hydroxyethyl cellulose, carboxymethylhydroxyethylcellulose, carboxymethylcellulose, xanthan, diutan, or any combination thereof.

5. The surfactant solution of claim 1, wherein the surfactant solution acts as a wettability altering agent to increase production of a subterranean formation.

6. The surfactant solution of claim 1, wherein the surfactant solution is thermally stable in a subterranean formation.

7. The surfactant solution of claim 1, wherein the surfactant solution is hydrolytically stable in a subterranean formation.

8. The surfactant solution of claim 1, wherein the first surfactant is an ether sulfonate having the formula: $R_1O(R_2O)_x(R_3O)_yCH_2CH(OH)CH_2SO_3M$, wherein $R_1$ is a linear or branched alkyl group having 5 to 30 carbon atoms, $R_2$ is $—CH_2CH_2—$, $R_3$ is $—CH(CH_3)CH_2—$, x is an integer from 2 to 30, y is an integer from 0 to 20, and M is a monovalent cation.

9. The surfactant solution of claim 1, wherein the solvent is methanol, ethanol, isopropanol, 1-propanol, butanol, acetone, ethyl lactate, glycerol, ethylene glycol, ethylene glycol butyl ether, butyl acetate, acetic acid, or any combination thereof.

10. The surfactant solution of claim 1, wherein a concentration of the first surfactant in the surfactant solution is from about 1 wt. % to about 65 wt. %.

11. The surfactant solution of claim 1, wherein the concentration of the first surfactant in the surfactant solution is from about 10 wt. % to about 45 wt. %.

12. The surfactant solution of claim 1, wherein a concentration of the second surfactant in the surfactant solution is from about 1 wt. % to about 80 wt. %.

13. The surfactant solution of claim 1, wherein the concentration of the second surfactant in the surfactant solution is from about 30 wt. % to about 50 wt. %.

14. The surfactant solution of claim 1, wherein a concentration of the solvent in the surfactant solution is from about 1 wt. % to about 90 wt. %.

15. The surfactant solution of claim 1, wherein the concentration of the solvent in the surfactant solution is from about 10 wt. % to about 35 wt. %.

16. The surfactant solution of claim 1, wherein a concentration of water in the surfactant solution is from about 1 wt. % to about 90 wt. %.

17. The surfactant solution of claim 1, wherein the concentration of water in the surfactant solution is from about 30 wt. % to about 45 wt. %.

18. The surfactant solution of claim 1, wherein the water comprises sodium chloride and calcium chloride and a concentration of sodium chloride in the water is up to about 25.0 wt. % and a concentration of calcium chloride in the water is up to about 5.0 wt. %.

\* \* \* \* \*